Figure 1:
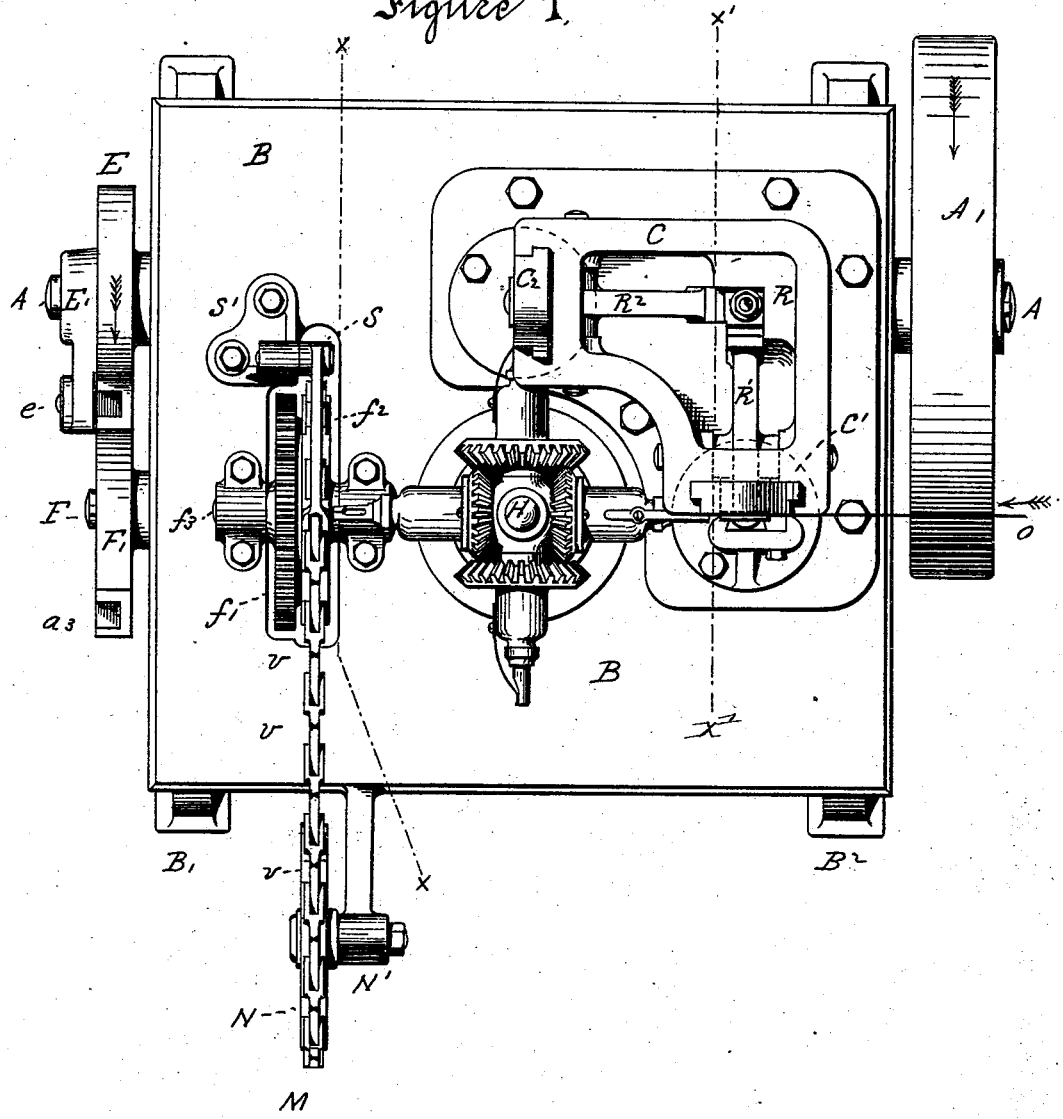

(No Model.)  W. F. DURFEE.  6 Sheets—Sheet 1.

MACHINE FOR CUTTING AND FORMING HORSESHOE NAIL BLANKS.

No. 260,177.  Patented June 27, 1882.

WITNESSES.  INVENTOR.

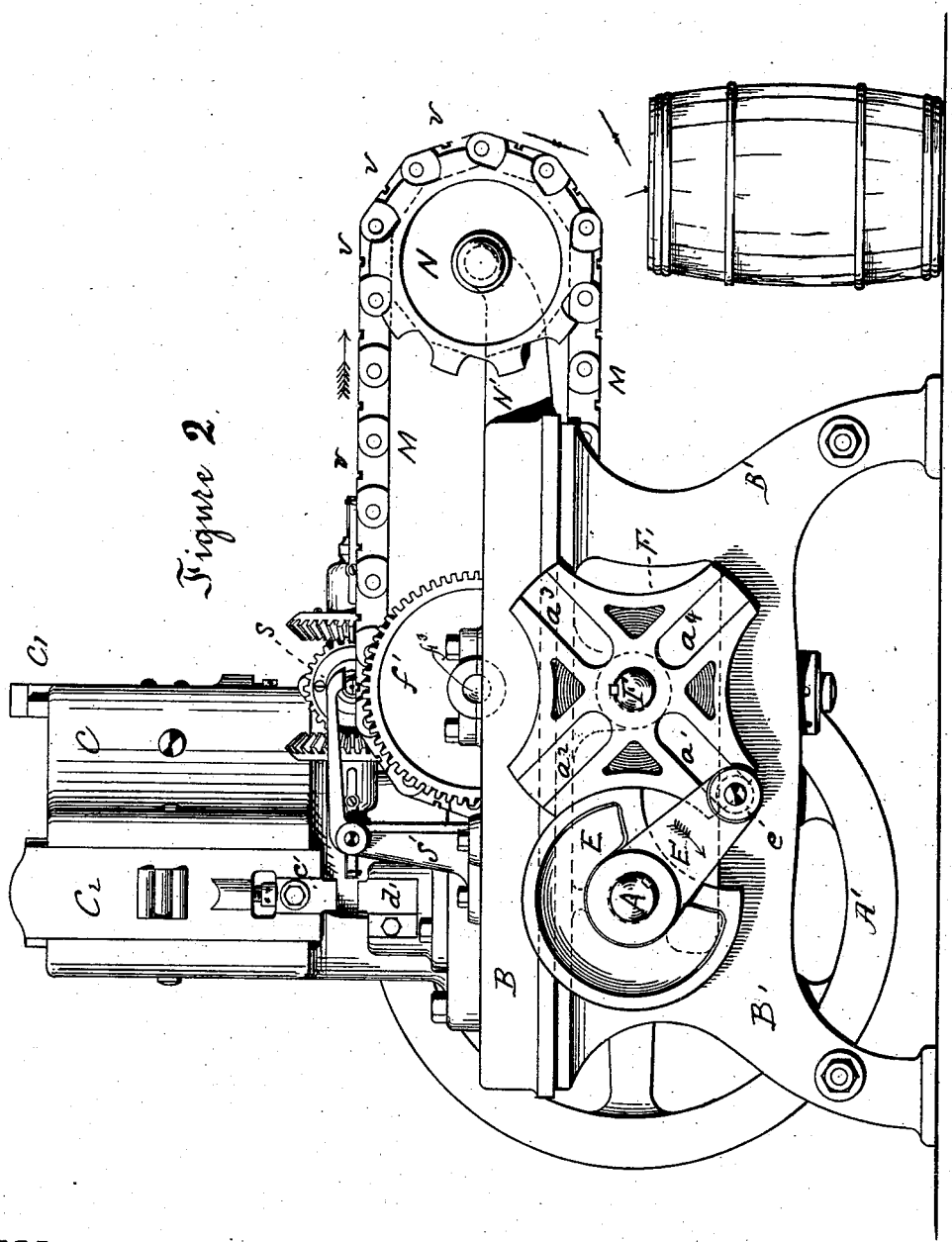

(No Model.) 6 Sheets—Sheet 3.
W. F. DURFEE.
MACHINE FOR CUTTING AND FORMING HORSESHOE NAIL BLANKS.
No. 260,177. Patented June 27, 1882.
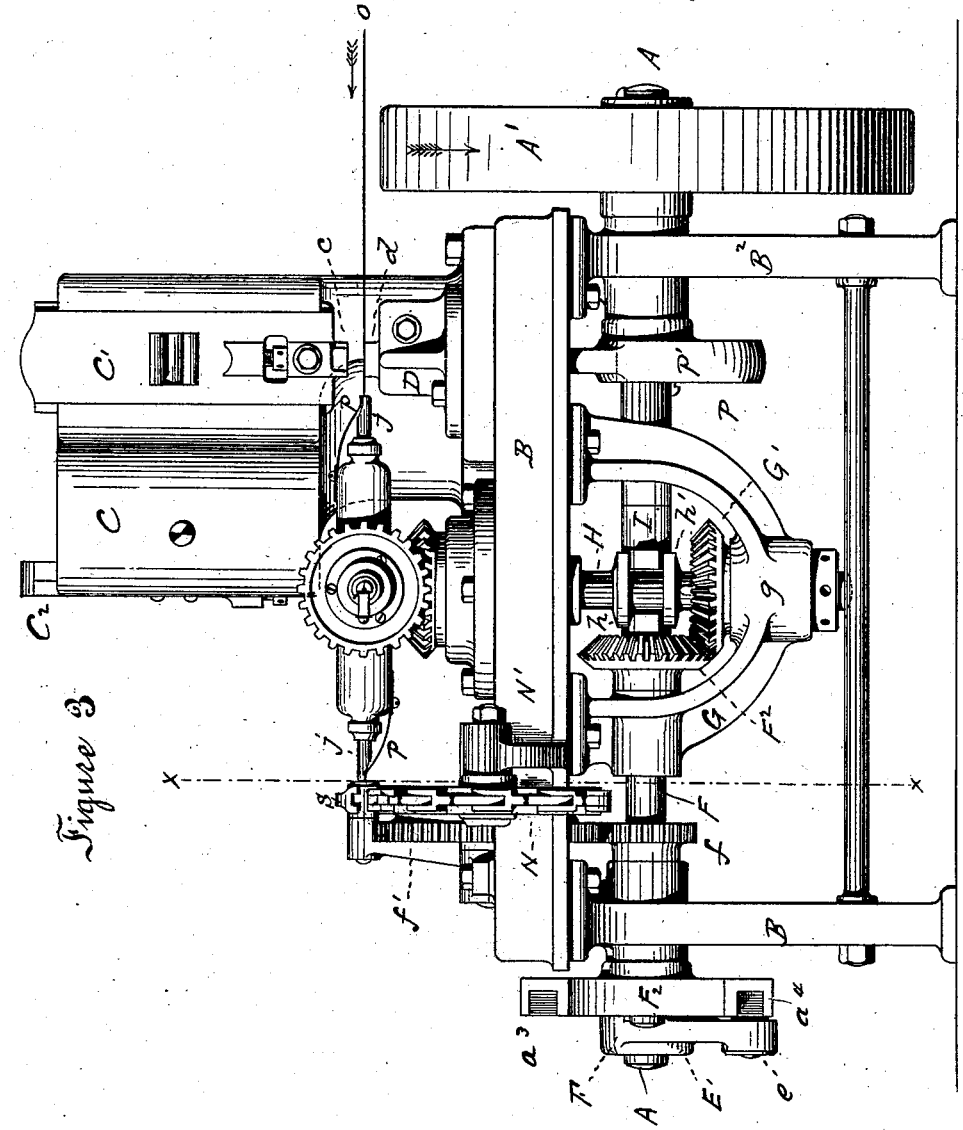
WITNESSES.
Albert R Lacey
George Terry
INVENTOR.
William F Durfee (No Model.) 6 Sheets—Sheet 4.
W. F. DURFEE.
MACHINE FOR CUTTING AND FORMING HORSESHOE NAIL BLANKS.
No. 260,177. Patented June 27, 1882.
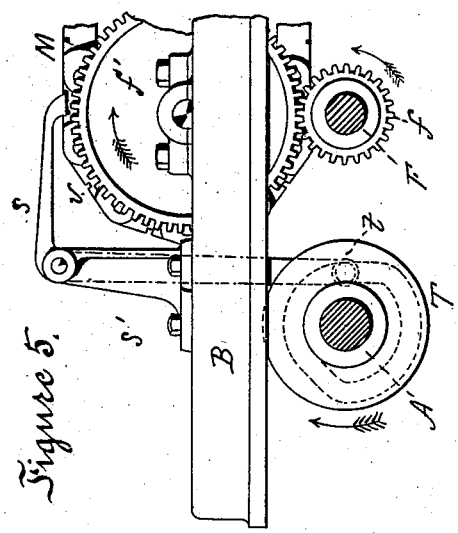
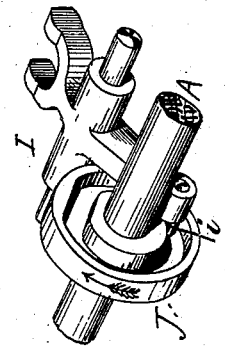
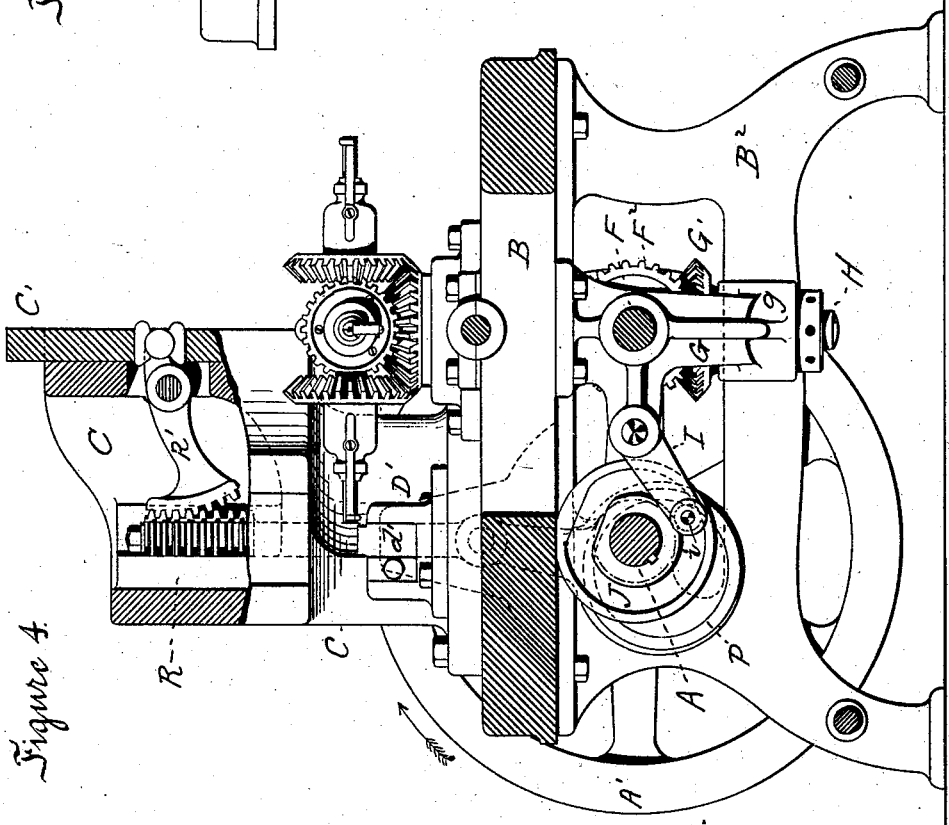
WITNESSES
INVENTOR
William F. Durfee (No Model.)  6 Sheets—Sheet 5.
W. F. DURFEE.
MACHINE FOR CUTTING AND FORMING HORSESHOE NAIL BLANKS.
No. 260,177. Patented June 27, 1882.
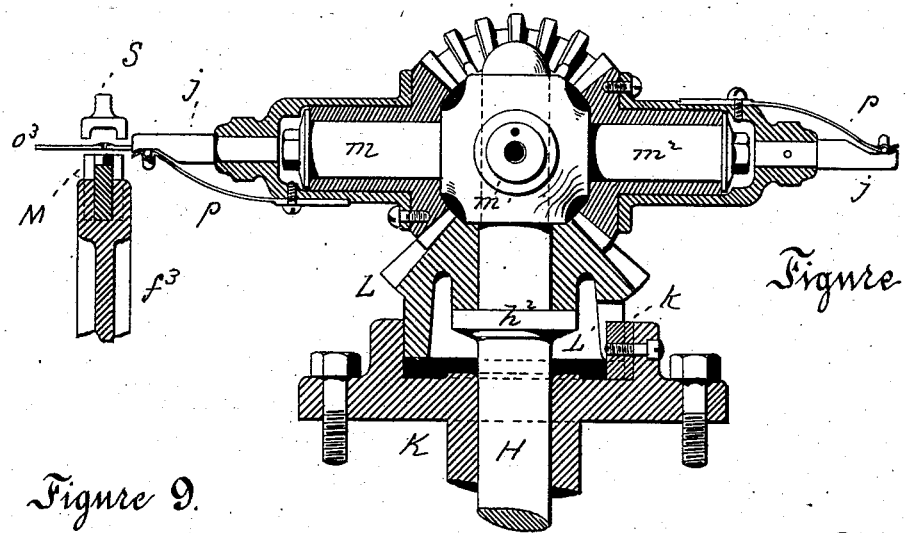
Figure 7.
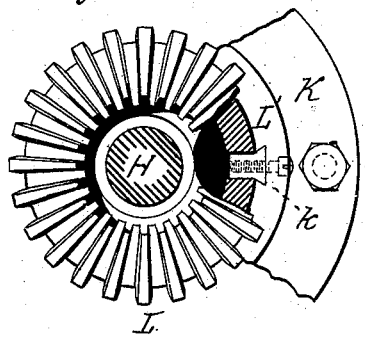
Figure 9.
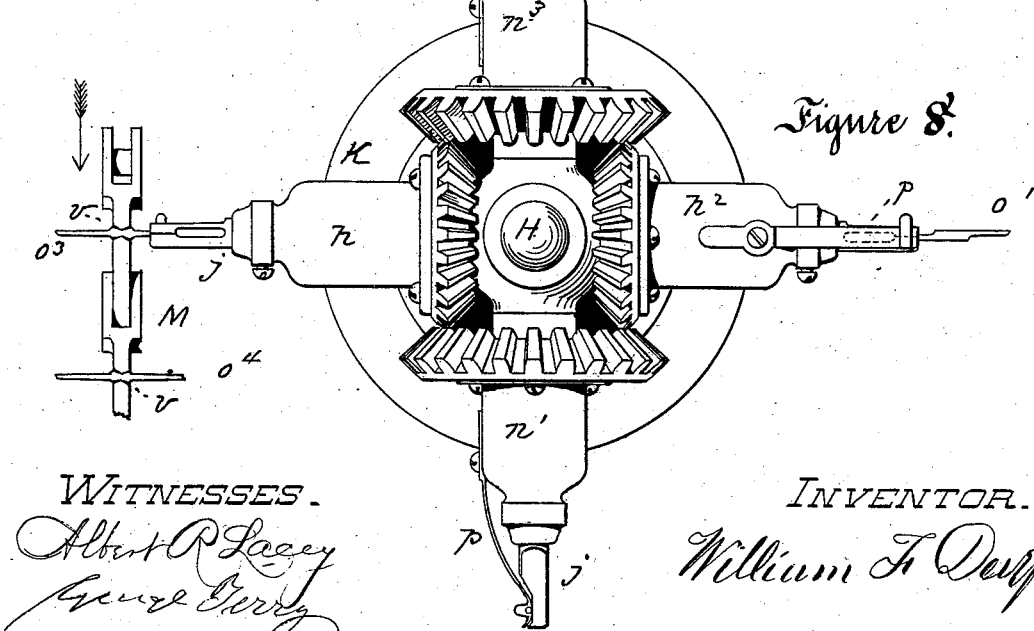
Figure 10.
Figure 8.
WITNESSES.
Albert R Lacey
George Terry
INVENTOR.
William F Durfee (No Model.) 6 Sheets—Sheet 6.
W. F. DURFEE.
MACHINE FOR CUTTING AND FORMING HORSESHOE NAIL BLANKS.
No. 260,177. Patented June 27, 1882.
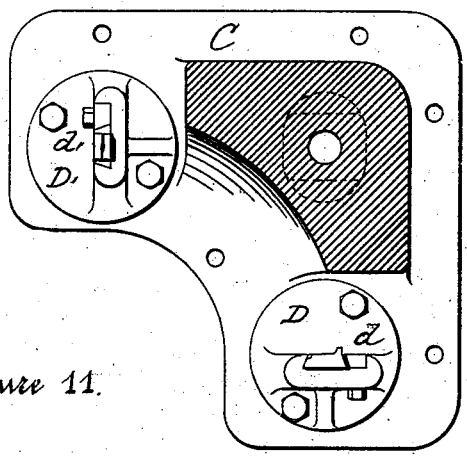
Figure 11.
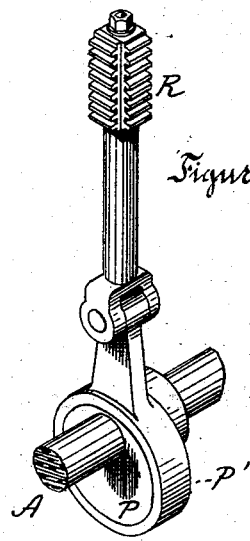
Figure 12.
Figure 13.
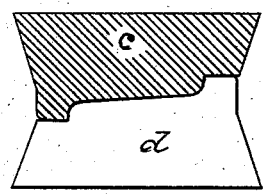
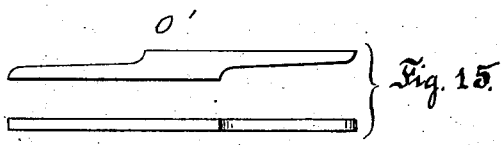
Fig. 15.
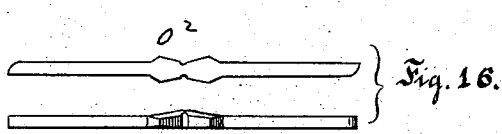
Fig. 16.
Figure 14.
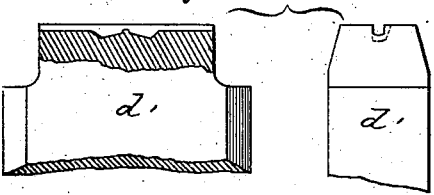
WITNESSES.
Albert R Lacey
George Terry
INVENTOR.
William F Durfee

UNITED STATES PATENT OFFICE.

WILLIAM F. DURFEE, OF BRIDGEPORT, CONNECTICUT, ASSIGNOR TO THE WHEELER & WILSON MANUFACTURING COMPANY, OF SAME PLACE.

MACHINE FOR CUTTING AND FORMING HORSESHOE-NAIL BLANKS.

SPECIFICATION forming part of Letters Patent No. 260,177, dated June 27, 1882.

Application filed November 17, 1881. (No model.)

*To all whom it may concern:*

Be it known that I, WILLIAM F. DURFEE, a citizen of the United States, residing at Bridgeport, in the county of Fairfield and State of Connecticut, have invented certain new and useful Improvements in Machinery for Cutting and Forming Horseshoe-Nail Blanks, of which the following is a specification.

The object of this invention is to facilitate the holding and conveying of the blanks from one part of the machine to another automatically; and the invention consists in the construction and arrangement of parts, as hereinafter more fully described and claimed.

Referring to the drawings annexed, Figure 1 shows the machine in plan, or as it would appear if viewed from above. Fig. 2 is a front elevation of the machine, and Fig. 3 shows it as when viewed from the right of Fig. 2. Fig. 4 is a sectional view of the machine as it would appear were all the parts to the left of the broken line $x$ $x$ of Figs. 1 and 3 removed, the upper portion of said figure showing a partial section of the press, taken on the broken line $x'$ $x'$ of Fig. 1, and serving to illustrate the mode of operating the press-gates. Fig. 5 is a fragmentary view of Fig. 2, wherein the frame of the machine is removed to show more clearly the manner of operating the chain-wheel and blank-inserting device. Fig. 6 shows in perspective the cam and forked lever which act to give a vertical reciprocation to the conveying mechanism. Fig. 7 is an enlarged sectional view of the conveying mechanism detached, and shows also to the left its relation to the chain, chain-wheel, and blank-inserting device. Fig. 8 is a plan view of the same mechanism, and, like the preceding figure, shows the relation of said mechanism to the blank-carrying chain. Fig. 9 shows a detached view of the bevel-gear which connects the four arms of the conveying mechanism, and illustrates the manner by which said gear is prevented from revolving, at the same time admitting of a vertical movement. Fig. 10 represents three enlarged views of one of the blank-holding devices carried at the end of each of the four arms of the conveyer. Fig. 11 is a sectional plan of that part of the press-frame which is below the level of the face of the lower dies, which dies are shown in their respective holders. Fig. 12 illustrates, detached, the eccentric and vertical rack-bar which imparts the vertical reciprocation to the two gates of the press. Fig. 13 is an enlarged plan view or diagram of the cutting-dies, the upper or moving die being shown in section. Fig. 14 represents in two views the upper part of the lower forming-die, a portion of the surface thereof being broken away to show the form of the blank matrix. Fig. 15 shows the form of a cut blank as it is received by the conveyer, and Fig. 16 the same blank after it has been conveyed to and operated upon by the forming-dies.

The general construction and operation of this machine is substantially as follows, to wit: A base-plate, B, being sustained by the two leg-frames B' and B², supports the various mechanisms. Secured on the top of the base-plate B aforesaid is a press having two vertically-reciprocating gates or slides, C' and C², contained in one frame, C, each of which gates is provided at its lower extremity with a die, the one carried by the gate C' being of a cross-section similar to that of $c$, Fig. 13, and the one carried by the gate C² having its face recessed similar to that of the lower forming-die shown in Fig. 14. The lower dies of these presses, $d$ and $d'$, are contained in the die-holding blocks D and D', respectively, which are secured to the foot-plate of the frame C aforesaid. (See Figs. 3, 4, and 11.)

Passing horizontally across the machine, below the base-plate B, and supported in bearings attached to the leg-frames B' B², is the rotating driving-shaft A, to which motion is communicated through the balance-wheel A', and from which the various mechanisms are operated in the manner to be hereinafter described.

To one end of the shaft A aforesaid is secured a disk, E, and crank E', said crank carrying near its end and projecting inward the pin $e$. (See Figs. 1, 2, and 3.) Arranged parallel to the shaft A, and in the same horizontal plane therewith, is the short shaft F, one end of which is supported in a bearing formed on the leg-frame B', a second bearing being provided for it in the semicircular hanging bracket G, which is suspended from and secured to the under side of the base-plate B. (See Figs. 3 and 4.) To the outer end of this short shaft F, and in the same vertical plane as the disk E, before mentioned, is the star-wheel F', which has four radial slots, $a'$, $a^2$, $a^3$, and $a^4$, formed in its face, between which slots the periphery of said wheel F' is cut away to permit the disk E to rotate. (See Figs. 1, 2, and 3.)

By the combined operation of the disk E, crank E', and star-wheel F' it will be seen that the pin $e$, (of the rotating crank E',) passing successively in and out of the slots $a'$, $a^2$, $a^3$, and $a^4$ of the star-wheel F', will cause said star-wheel and its attached shaft F to be intermittingly rotated through one-quarter of a revolution during the interval that the shaft A is performing a like portion of its rotation, and that the star-wheel F' will remain stationary while the shaft A moves through its remaining three-fourths of a revolution. The intermittent motion thus given to the shaft F is utilized to perform other movements in the machine in the following manner:

Secured to the shaft F, between the supporting-bearings thereof, is the spur-pinion $f$, which engages with the chain driving gear $f'$, said gear being rigidly attached to and carrying the chain-wheel $f^2$, which thus has an intermittent rotary motion imparted to it. The shaft $f^3$, sustaining said gear $f'$ and chain-wheel $f^2$, is carried in bearings attached to the base-plate B of the machine immediately above the shaft carrying the spur-pinion $f$. (See Figs. 1, 2, 3, and 5.)

To the inner extremity of the short shaft F is secured a miter-gear, $F^2$, which engages with and imparts an intermittent rotary motion to the miter-gear G', whose axis is vertical. The miter-gear G' has a downwardly-projecting sleeve formed thereon, which is fitted within the large hub $g$ of the semicircular hanging bracket G, so that it is free to revolve in obedience to the action of the miter-gear $F^2$.

Passing through this miter-gear G' and its sleeve is the vertical shaft H, to the upper end of which is attached the conveying mechanism. The shaft H is not rigidly secured to the miter-gear G', but is connected thereto by means of a "feather," in such a manner that the shaft H aforesaid may be moved vertically while it is being rotated by the miter-gear G'. The vertical movement of this shaft H is controlled by the forked lever I, (see Figs. 3, 4, and 6,) which is pivoted in bearings attached to the hanging bracket G. The open or forked end of this lever embraces the shaft H between the two rings $h$ $h'$, formed thereon, (see Fig. 3,) the opposite end of said lever, having the pin $i$ attached, being acted upon by the grooved cam J, secured to the rotating shaft A in such a manner as to cause the vertical shaft H and the mechanisms attached thereto to receive intermittingly a vertical reciprocating movement. (See Figs. 3, 4, and 6.)

The details of the blank-conveying mechanism arranged at the upper end of the vertical shaft H being more clearly illustrated by the enlarged views, Figs. 7, 8, 9, and 10, I will refer more particularly to said views in describing its construction and operation. The shaft H, which has an intermittent motion imparted to it, as hereinbefore described, passes vertically through its bearing-plate K, which is secured to the base-plate B. Above this bearing-plate, and with its rim fitted into a circular recess formed in the top of the plate K, is the miter-gear L, whose vertical position is controlled by the shaft H, (it being confined between the collar $h^2$ and the hub of the conveying-arms,) said gear being prevented from revolving by the key $k$, secured in the stationary bearing-plate K, and projecting into a notch formed in the downwardly-projecting rim L' of said miter-gear L. (See Figs. 7 and 9.) Above this miter-gear, and secured rigidly to the upper extremity of the shaft H, are the four radially-projecting arms of the conveyer, arranged at right angles to each other, three of which arms are shown in Fig. 7, and designated therein as $m$, $m'$, and $m^2$. (The fourth arm lies opposite to $m'$.) Each of the four arms aforesaid carries a miter-gear, the teeth of which mesh into the single miter-gear L, before described, and are thus caused to rotate independently of each other, so that when the vertical shaft H is revolved about its axis each of the miter-gears carried thereby will rotate isochronously about their several axes, making one revolution thereon to each revolution of the shaft H aforesaid, the whole being so arranged and proportioned that the several sleeves, $n$, $n'$, $n^2$, and $n^3$, attached to the revolving miter-gears and carrying the blank-holding devices at their extremities, will perform one-quarter of a revolution on their respective axes, and also one-quarter of a revolution about their common axis H, once during each revolution of the driving-shaft A.

The chain-wheel $f^2$, whose operation has been hereinbefore described, is partly surrounded by and imparts motion to the endless blank-carrying chain M, each link of which has a notch, $r$, cut in its outer face for the reception of the notched central portion of the formed blanks. (See Fig. 16.) This chain moves intermittingly through a space equal to the length of one link (in the direction indicated by its arrow in Fig. 2) at each revolution of the shaft A, and is partially sustained by the chain-wheel N, which is carried on a stud at the end of the supporting-bracket N', projecting from one side of the base-plate B. (See Figs. 1, 2, and 3.)

The mechanisms which act to operate the two press-gates C' and $C^2$ isochronously consist of an eccentric, P, secured to the rotating driving-shaft A, which eccentric acts, through the intervention of the connection P', to impart a vertical reciprocating movement to the rack-bar R, (see Figs. 3, 4, and 12,) said rack-bar R being guided in the press-frame C, its motion being transmitted through the toothed sectors at the end of the levers R' and $R^2$ to the gates C' and $C^2$, respectively. (See Figs. 1 and 4.)

In performing the several operations required for the production of blanks, such as are shown by Fig. 16, the several parts of this machine operate as follows: The rod of metal from which the blanks are to be cut is shown as entering the mechanism at the right-hand side of the drawings, Figs. 1 and 3, said rod being designated as $o$, and resting in such a position on the lower cutting-die, $d$, of the cutting-press that the descent of the press-gate $C'$, with its cutting-die $c$, will sever the rod and leave its advancing end of the form shown by the left-hand end of the blank illustrated in Fig. 15, after which action the press-gate ascends and the rod of metal $o$ is moved a fixed distance toward the conveying mechanism, its advancing end being forced between the spring-jaws $j$ and under the retaining-spring $p$, carried at the end of that arm of the conveyer which is at the time adjacent to said cutting-dies $c$ and $d$. As soon as the conveyer has thus obtained control of the end of the rod of metal $o$ the press-gate $C'$, with its cutting-die $c$, again descends and severs a blank from the rod of metal, of a form similar to that shown in Fig. 15, in the course of which descent, and from the moment that the under side of the cutting-die $c$ comes in contact with the upper surface of the rod of metal $o$, the conveying mechanism is moved downward isochronously with the cutting-gate $C'$ by means of the cam $J$, hereinbefore described, which acts through the intervention of the forked lever $I$ to give a downward movement to the shaft $H$ and the conveying mechanism attached thereto, which, as will be seen, would cause the gate $C'$, the blank $o'$, (see Fig. 8,) and the conveyer to move downward in unison, and thereby prevent said blank $o'$ from being bent or misshapen. After the gate $C'$ has reached its lower limit of motion it begins to ascend, and the conveyer follows it with precision until said conveyer has arrived at its upper limit of motion, or that in which it is illustrated in the several figures of the drawings. During the time that the gate $C'$ is performing the remaining portion of its ascending movement the shaft $F$ is turned through one-quarter of a revolution, as hereinbefore described, which partial rotation causes the chain to be advanced one link and the arms of the conveyer to be advanced through one-quarter of a revolution, thus presenting another arm in position to receive the advancing end of the rod, while the arm carrying the cut blank has turned so as to present the cut blank aforesaid on edge to the dies of the forming-press, said dies being designated as $c'$ and $d'$. (See Figs. 2, 4, 11, and 14.) While the arms of the conveyer are in this position the cutting-press $C'$ again descends, as does also the gate $C^2$ of the forming-press, the first acting, as before, to sever a blank from the end of the rod of metal $o$, and the second acting to press or form the previously-cut blank into the desired shape, or that shown by Fig. 16. The vertical movement of the conveyer is utilized at the forming-dies to lower the blank into and to remove it from the recess formed in the face of the lower die, $d'$, thereof. After having formed the first and severed a second blank from the rod of metal $o$ the press-gates $C'$ and $C^2$ ascend, while the conveying mechanism is again moved about its axis through an angle of ninety degrees and the arms thereof through a like portion of a revolution, which combination of rotations brings the freshly-cut blank $o'$ over the lower forming-die, $d'$, and the shaped blank $o^2$ over one of the receiving-notches $v$ in the adjacent link of the carrying-chain M, as at $o^3$. (See Figs. 7 and 8.)

To remove the finished blanks from the spring-jaws $j$ at the extremities of the conveyer-arms, and to deposit them into the receiving-notches $v$ of the carrying-chain M, I have provided what I have previously referred to as the "blank-inserting" device, (see Fig. 5,) which consists of a bell crank lever, S, pivoted to the standard S', attached to the base-plate B, (see Figs. 1, 2, 3, and 5,) the moving end of the horizontal branch of said lever S having two downwardly-projecting lips, which, when said arm is at its lowest limit of motion, bestride the chain M. (See Fig. 7.) The vertical or pendent arm of the lever S aforesaid has at its lower end the projecting pin $t$, through which an intermittent pendulous motion is given to the said lever by the action of the rotating cam T, which engages with the pin $t$, as shown in Fig. 5.

Referring to Figs. 7 and 8, the conveyer-arm at the left is represented as holding the blank $o^3$ directly above a notch in the chain M and under the extremity of the inserting-lever S, this being the relation of the parts named at the instant before the conveyer and the inserting device start to move downward. The downward movement of the blank-inserting lever S, being isochronous with that of the conveyer, deposits the blank $o^3$ (previously referred to as occupying a position over a notch of the chain M) into the receiving-notch in said chain M. (See Figs. 7 and 8.) The upward movements of the conveyer and the inserting-lever are not isochronous; but the blank $o^3$, having been deposited into the notch $v$ aforesaid, is held down by the lever S until the conveyer has finished its upward movement and performed so much of its next quarter-turn as to free itself entirely from the blank, which then occupies the position of the blank $o^4$. (See Fig. 8.)

In the course of the upward movement of the conveyer the spring holding-jaws $j$ rise off from the end of the blank and the moving end of the retaining-spring $p$ is depressed, immediately after which the conveyer-arm begins to rotate and to move away from the blank, the spring $p$ resuming its normal position. The empty conveyer-arm is then in condition to receive a freshly-cut blank, on which the foregoing operations are repeated.

It will thus be seen that the conveying mechanism herein described, actuated through the vertical shaft H, controls the movements of three blanks at the same instant, the first of which is freshly cut, the second formed, and the third inserted into the notches $v$ of the chain M, and that by successive repetitions of these operations finished blanks are produced and inserted into the successive links of chain M, by which they are carried along to a convenient position for delivery and there deposited into any convenient receptacle. (See Fig. 2.)

Having thus fully described my invention, what I claim as new, and desire to secure by Letters Patent, is—

1. The combination, with the vertically-reciprocating and intermittingly-revolving conveyer, having radial arms provided with spring-jaws and a retaining-spring, of a carrying-chain having notches for the reception of the finished blanks, and means for forcing the blanks from the jaws of the conveyer into said notches, substantially as described.

2. The combination of a conveyer having radial arms provided with spring-jaws, a notched carrying-chain, M, for the reception of the blanks, a bell-crank lever, S, the horizontal arm of which is provided with downward-projecting lips adapted to bestride the chain, its pendent arm having a pin, $t$, and a cam, T, which intermittingly actuates said lever and causes the lips thereof to detach the blanks from the conveyer-arms and deposit them in the notched chain, substantially as described.

3. The combination of the cutting-dies $c$ $d$, forming-dies $c'$ $d'$, the vertically reciprocating and rotating shaft H, having radial arms provided with spring-jaws $j$, the notched carrying-chain M, and lever S, substantially as described.

In testimony whereof I affix my signature in presence of two witnesses.

WILLIAM F. DURFEE.

Witnesses:
 ALBERT R. LACEY,
 GEORGE TERRY.